W. T. JOYNER.
PEANUT SEPARATOR.
APPLICATION FILED AUG. 1, 1911.
1,035,447.
Patented Aug. 13, 1912.
2 SHEETS—SHEET 1.
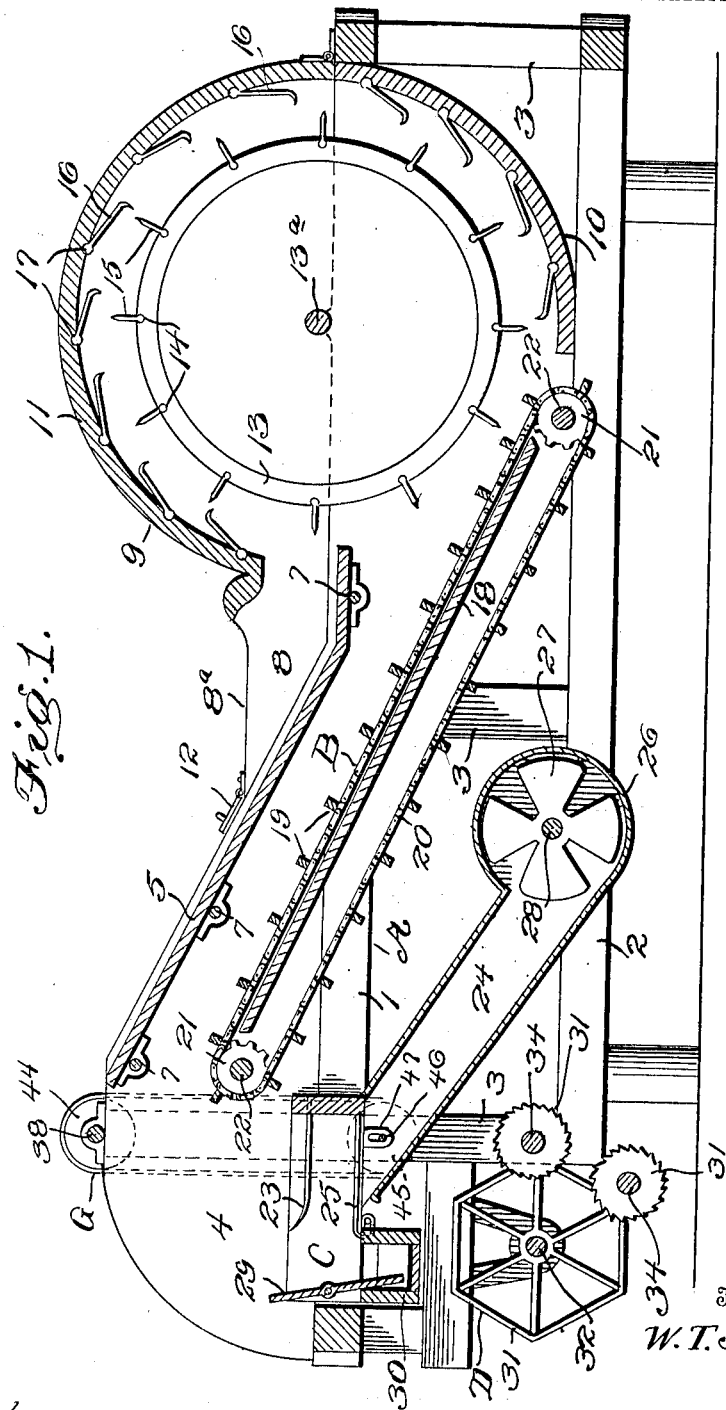
Witnesses
Cora K. Hardy.
Juana M. Fallin
Inventor
W. T. Joyner.
By
Attorneys.

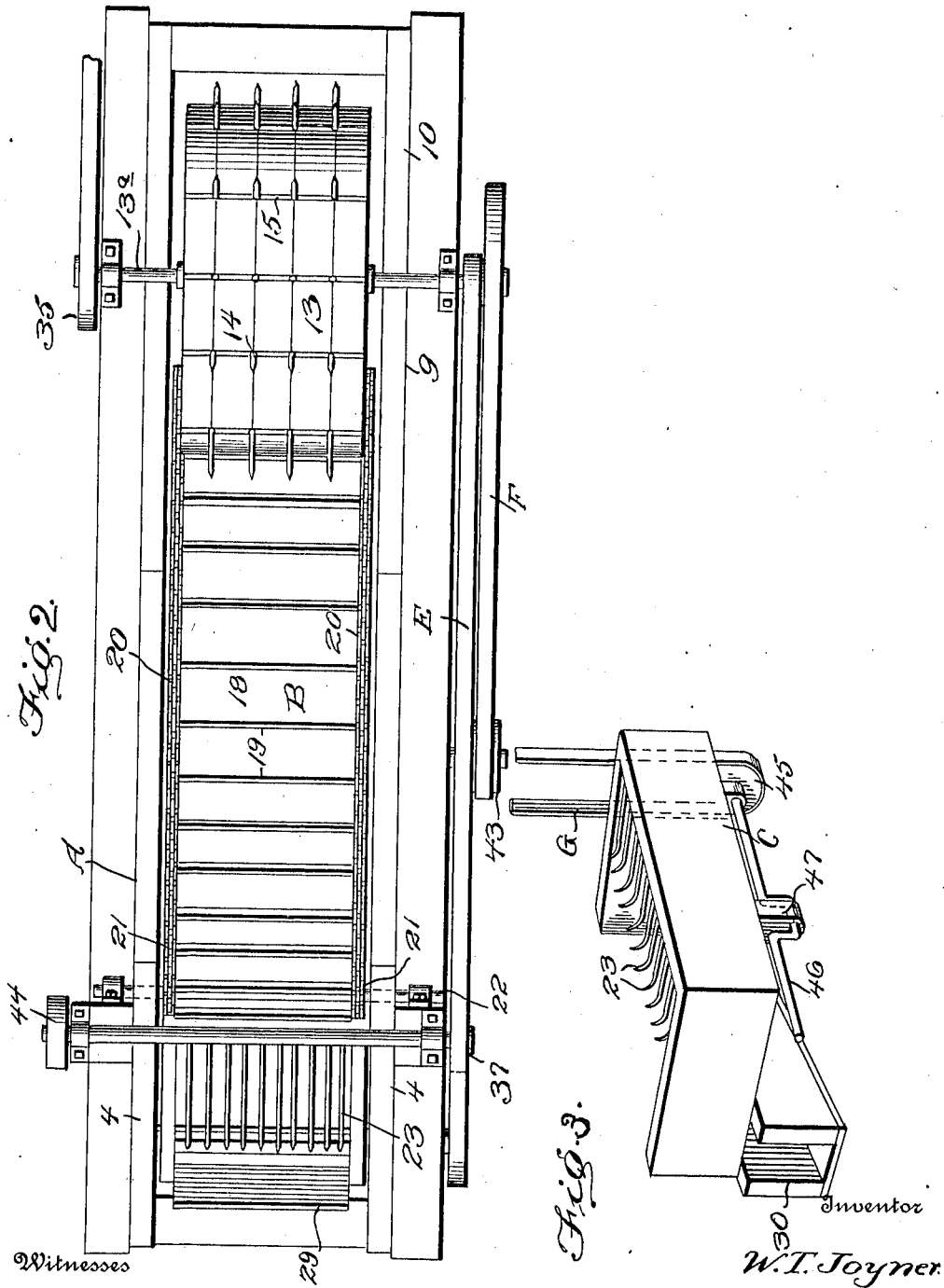

UNITED STATES PATENT OFFICE.

WILLIAM T. JOYNER, OF SUFFOLK, VIRGINIA, ASSIGNOR OF ONE-HALF TO JAMES H. CORBITT, OF SUFFOLK, VIRGINIA.

PEANUT-SEPARATOR.

1,035,447.   Specification of Letters Patent.   Patented Aug. 13, 1912.

Application filed August 1, 1911. Serial No. 641,822.

*To all whom it may concern:*

Be it known that I, WILLIAM T. JOYNER, a citizen of the United States, residing at Suffolk, in the county of Nansemond and State of Virginia, have invented certain new and useful Improvements in Peanut-Separators, of which the following is a specification.

This invention comprehends certain new and useful improvements in harvesting machinery for peanuts and similar crops, and the invention has for its primary object a simple, durable and efficient construction of peanut picker embodying a novel and useful shaking shoe or screen into which the peanuts are fed from an inclined elevator or conveyer which in turn receives the peanuts, vines and trash from a beater or drum, the parts being so arranged that they may be easily manufactured and assembled and may be driven with comparatively little power, the strain of the driving belts or similar elements being effectively distributed so as to avoid any undue strain on any one part. And the invention also aims to generally improve this class of apparatus and to render it more useful and commercially desirable.

With these and other objects in view, as will more fully appear as the description proceeds, the invention consists of certain constructions, arrangements and combinations of the parts that I shall hereinafter fully describe and claim.

For a full understanding of the invention, reference is to be had to the following description and accompanying drawing in which:

Figure 1 is a longitudinal sectional view of my improved peanut picker; Fig. 2 is a top plan view, parts being omitted to show the interior construction; Fig. 3 is a detail perspective view of a shaking shoe employed.

Corresponding and like parts are referred to in the following description and indicated in all the views of the drawings by the same reference characters.

The framework A of my improved peanut picker may be of any desired size, construction, and design, and may be so arranged that it may be supported in a stationary manner or mounted upon trucks, either detachably or permanently, so that it may be easily carried from place to place. In the present embodiment of the invention illustrated in the accompanying drawings, said framework embodies upper sills 1, lower sills 2 parallel to the sills 1, and any desired number of connecting uprights 3, together with any desired number of cross bars or braces.

At the rear of the machine, denoted as such because the peanuts are finally discharged from such end, the upper sills 1 support upright and laterally spaced side boards 4 between which an inclined board 5 is set so as to constitute, with the side boards 4, an inclined chute, into which the peanuts on the vines are fed, preferably by hand. In the preferred construction of the apparatus, the inclined board 5 is secured in place detachably by tie rods 7 connected to the side boards 4, whereby the board 5 may be detached whenever desired so as to obtain a view of and access to the subjacent parts, for the purposes of repair or the like.

The chute discharges into the mouth 8 of a casing 9 which is supported in the framework A, said casing including a lower relatively stationary section 10 inclosed in the framework, and a hinged top section 11 preferably provided with a latch or latches 12 by which it may be secured in closed position. The mouth 8 of the casing is preferably formed by extensions 8ᵃ on the top section 11, as clearly illustrated in the drawing. A beater cylinder 13 is journaled in the casing 9 on a transversely extending shaft 13ᵃ mounted in suitable bearings on the upper sills 1, and said cylinder is preferably provided with any desired number of inset bars 14 of metal or other substance provided with any desired number and disposition of teeth 15 which in the present instance project radially (although not necessarily so) and are arranged in circumferentially spaced transversely extending sets. These teeth 15 co-act with pickers 16 arranged in any desired way in the casing 9 and projecting in any desired direction from the inner wall thereof, the pickers 16 in the present instance being also secured to or formed on metallic or other inset bars 17, as shown.

As the peanuts, clinging to the vines, are tossed or dumped on to the chute, they are fed thereby into the mouth 8 of the casing 9 and, the vines meeting the revolving teeth 15 and the relatively stationary pickers 16, are broken up and the peanuts separated therefrom, the whole being finally dropped from the casing on to the upper stretch of a rearwardly and upwardly inclined conveyer B mounted in the framework below the bottom board 5 of the chute.

The conveyer B, in the present embodiment of the invention, includes an inclined bottom board 18, a series of transverse slats 19 adapted to slide upon the upper surface of said board, and sprocket chains 20 to which the slats are connected in any desired way, the sprocket chains passing over sprocket wheels 21 that are secured to upper and lower transverse shafts 22.

As the peanuts and trash are carried upwardly by the conveyer B, they are finally passed therefrom into a shaking shoe C which is in the form of a substantially rectangular box movably mounted between the spaced side boards 4 near the rear end of the latter and in the rear end of the framework A. Said shoe is provided with any desired number of separating fingers 23 which project inwardly, that is, rearwardly, from that wall or side of the shoe which lies approximately directly under the discharge end of the conveyer, and the broken vines and lighter trash are blown out from the rear end of the machine by means of a blast of air issuing from the flue 24, while the peanuts are dropped through or off of the fingers 23 into the bottom of the box or shoe C, most of them falling upon a screen 25. The flue 24 extends upwardly and rearwardly from a fan casing 26 in which a fan 27 is mounted, the fan being secured upon a transverse shaft 28, as shown.

It will be noted that the free ends or extremities of the fingers are turned upwardly so that the material deposited thereon can not slide directly off the fingers but will be held thereon so that the heavier and lighter particles will be separated by the vibrations of the shoe. It will also be noted that the screen 25 extends across the upper end of the blast flue 24 so that the air blast will be directed through the screen onto the material falling from between the fingers and the peanuts will be fed into the chute 30 by the vibrations of the shoe while the pieces of vines and other light particles will be blown out beyond the ends of the separating fingers. The rear side of the box is formed by an end gate 29 which is pivotally mounted in the sides of the shoe and extends between the same and is so disposed that it depends into the chute 30, as clearly shown in Fig. 1. The end gate may be readily adjusted so as to more or less close the entrance to the discharge chute 30 and at the same time enlarge the escape opening between the gate and the ends of the separating fingers so that if the vines should be excessive the blast may act effectually thereon so as to blow from the shoe all pieces of the vines and leaves, and very little, if any, of these elements will pass into the chute.

The bottom of the shoe C is open, as shown, save for the screen 25, said open bottom overlapping the forward side of the laterally inclined chute 30, the wires forming the screen being secured to said side, as clearly illustrated in the drawing, and as the peanuts drop into the shoe and on to the screen, they pass or are blown into the chute 30 and are deflected from said chute into a cleaning and stemming drum D.

The drum D is in the present embodiment of the apparatus constructed of a predetermined number of spoked pulleys or heads 31 mounted upon a transverse shaft 32 journaled in bearings in the framework, said heads being spaced from each other a distance sufficient to permit of the passage into the frame of saws or toothed disks 33, of which there may be any desired number in a set and any desired number of sets. In the present instance there are two sets of these toothed disks, the same being mounted upon transverse shafts 34 journaled in the framework. The purpose of these saws or toothed disks is to cut off and otherwise remove from the nuts the small stems which might up to this time adhere thereto in the harvesting operation, and as the spoked heads 31 are preferably octagonal or otherwise polygonal in shape, it will be clear that the peanuts will be tumbled around in the drum and thus be cleaned, being finally discharged from one end of the drum into any suitable receptacle (not shown).

It is to be understood that any desired mechanism may be employed for driving the various parts and for shaking the shoe C and that various changes may be made in the construction, arrangement and proportions of the parts without departing from the scope of the invention as defined in the appended claim. For the driving mechanism however, I prefer to use the following elements, although it is to be understood that while belts or pulleys and band wheels are mentioned, they are to be considered the equivalent of sprocket chains and sprocket wheels. The main or beater shaft 13$^a$ is driven from any suitable source of power (not shown), by means of a main driving pulley 35 at one side of the machine, and on the opposite side of the machine said shaft 13$^a$ carries a relatively small pulley over which a belt E passes. The belt E also passes over a pulley 37 on a shaft 38 extending transversely of the machine above the side boards 4, thence around a pulley secured to one end of the drum shaft 32, thence around pulleys on the saw shafts 34 and thence around a pulley on the upper conveyer shaft 22. A relatively large pulley is also secured to the shaft 13$^a$ at this side of the machine, and a belt F passes around said pulley and also around a pulley 43 on one end of the fan shaft 28, whereby the conveyer, the cleaning and stemming drum, the stemming saws, and the fan are all actuated from the main shaft 13ª of the machine, practically the entire strain of the operating parts or the power imposed thereon being taken up largely by the beater shaft and being properly distributed therefrom.

In order to operate the shoe C, the shaft 38 carries, on that side of the machine where the drive pulley 35 is mounted, a pulley 44, and a belt G passes around the pulley 44 and also around a pulley 45 on a crank shaft 46 journaled in the framework. The cranks of the shaft 46 are connected by links 47 to the shaking shoe C, whereby, as said shaft is rotated, a vibratory movement will be imparted to the shoe.

From the foregoing description in connection with the accompanying drawings, the operation of my improved peanut harvesting machine will be apparent, as the operations of the different parts have been set forth in detail hereinbefore in connection with the description of the construction and relative arrangement of parts.

What I claim is:

A separator provided with a shaking shoe embodying a box formed with one side and two ends and open at its top and bottom and the other side, a chute secured to the box at the bottom thereof and at the open side, a screen secured to the other side of the box and to the adjoining side of the chute, a series of separating fingers secured at one end to the last named side of the box at the top thereof and terminating in spaced relation to the open side of the box, and an end gate tiltably mounted in the open side of the box and extending down into the chute.

In testimony whereof, I affix my signature in presence of two witnesses.

WILLIAM T. JOYNER. [L. S.]

Witnesses:
 JAMES A. BERGES,
 RUTH V. MARSHALL.

---

Copies of this patent may be obtained for five cents each, by addressing the "Commissioner of Patents, Washington, D. C."